United States Patent [19]

Reese

[11] 4,057,411

[45] Nov. 8, 1977

[54] HEAT TREATING GLASS SHEETS ON A ROLLER HEARTH CONVEYOR

[75] Inventor: Thomas J. Reese, Sarver, Pa.

[73] Assignee: PPG Industries, Inc., Pittsburgh, Pa.

[21] Appl. No.: 655,049

[22] Filed: Feb. 4, 1976

[51] Int. Cl.² .......................................... C03B 27/00
[52] U.S. Cl. ........................................ 65/114; 65/349; 65/351
[58] Field of Search ................ 65/106, 273, 275, 163, 65/349, 350, 351, 114

[56] References Cited

U.S. PATENT DOCUMENTS

| | | | |
|---|---|---|---|
| 1,885,306 | 11/1932 | Sylvester | 65/163 UX |
| 3,881,906 | 5/1975 | Ritter, Jr. et al. | 65/349 X |
| 3,891,420 | 6/1975 | Frank | 65/106 |
| 3,929,441 | 12/1975 | Frank | 65/106 |

*Primary Examiner*—Arthur D. Kellogg
*Attorney, Agent, or Firm*—Dennis G. Millman; Edward I. Mates

[57] ABSTRACT

The present invention improves the quality of glass sheets with respect to roll ripple distortion by providing criteria for selectively maintaining conveyor rolls in a critical portion of the conveyor which comprises only those rolls located within an area defined by a first location a short distance upstream of the exit of the furnace and a second location a short distance downstream of the furnace exit. Surprisingly, by maintaining adequate alignment and using relatively small diameter, closely spaced conveyor rolls in this critical conveyor portion only, roll ripple distortion has been reduced to a considerable extent. The remaining conveyor rolls in the other portions of the conveyor need not be subjected to as frequent maintenance as the rolls in the critical portion of the conveyor, thereby lessening the cost of maintaining glass sheet heat-treating apparatus in good operating condition.

12 Claims, 4 Drawing Figures

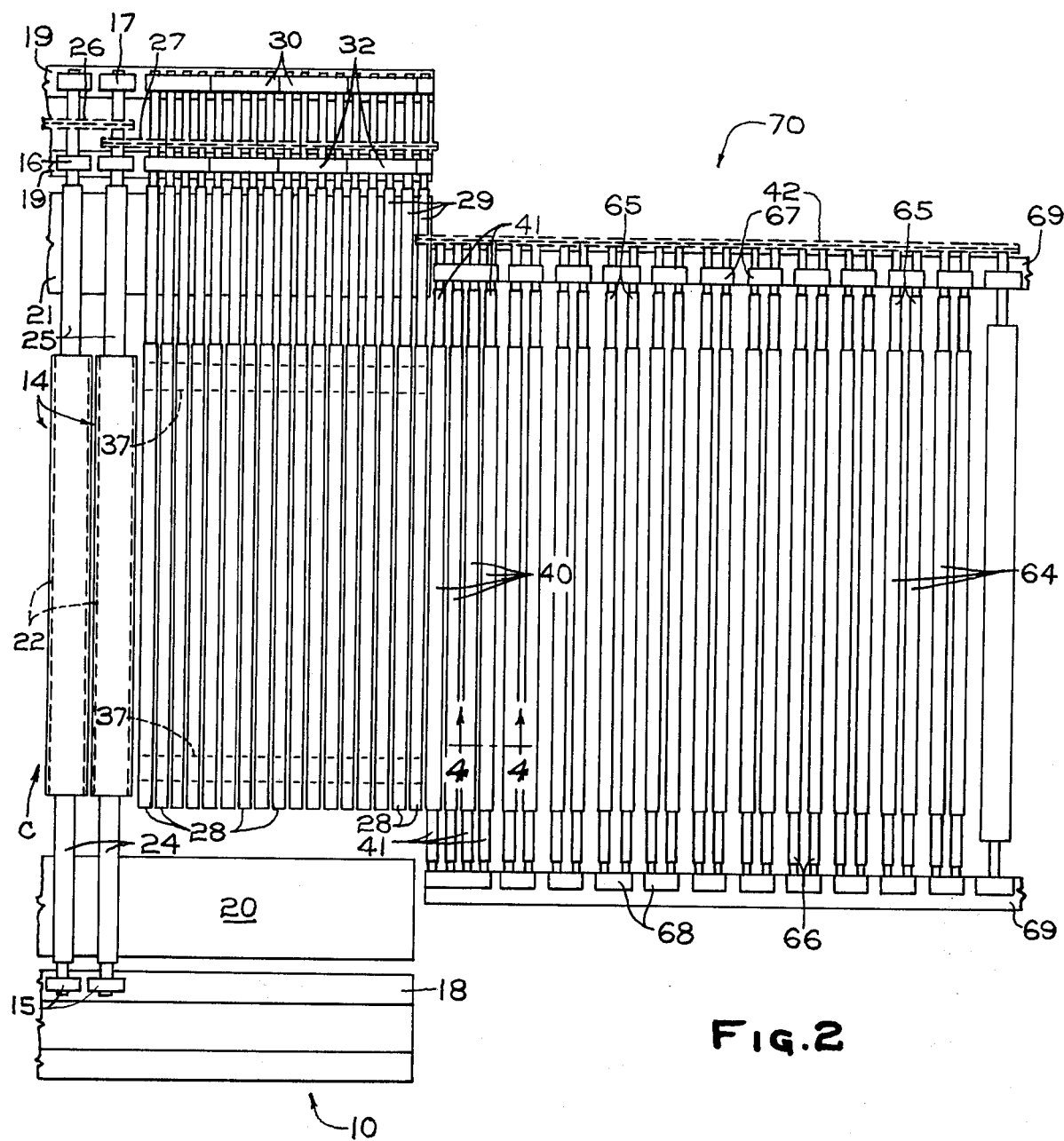
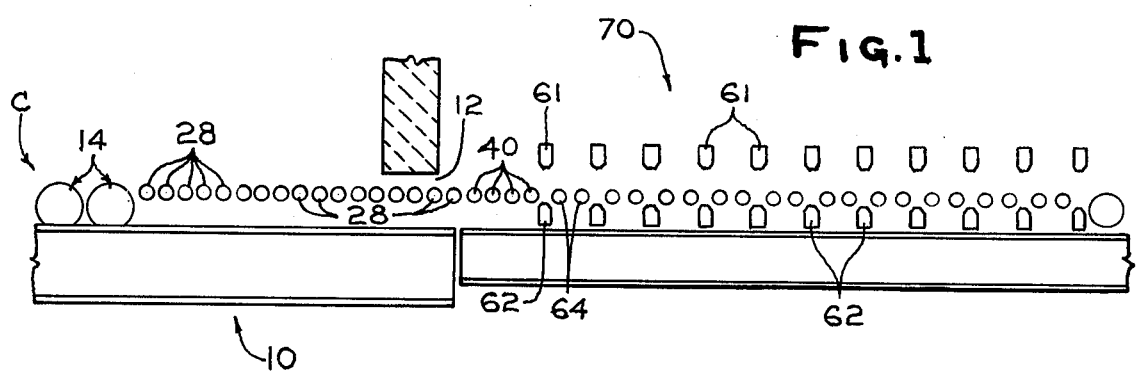
Fig.2
Fig.1

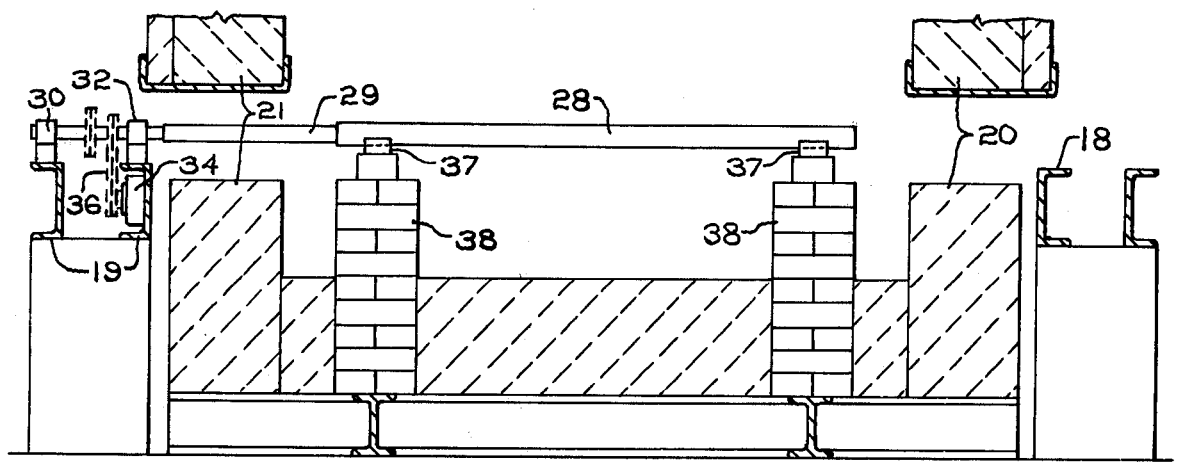
Fig. 3
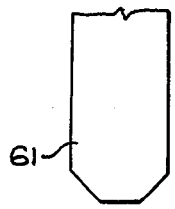
Fig. 4
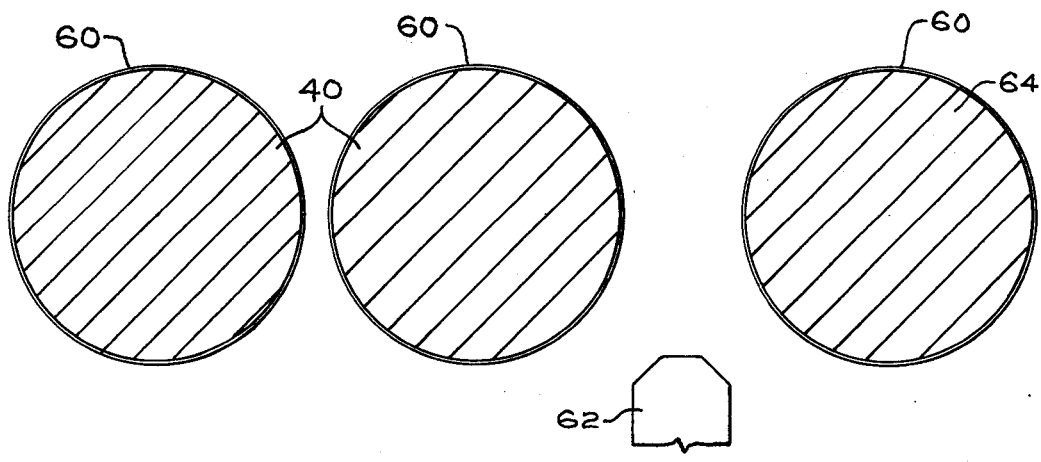

HEAT TREATING GLASS SHEETS ON A ROLLER HEARTH CONVEYOR

BACKGROUND OF THE INVENTION

1. Field of the Invention

This invention relates to heat-treating glass sheets while conveyed on a roller conveyor.

It is known to temper flat glass by heating a series of glass sheets while conveying the latter in a horizontal plane on spaced, rotating, parallel conveyor rolls through a tunnel-type furnace having an entrance end and an exit and continuing to convey the heated sheets on additional spaced, rotating, parallel conveyor rolls through a cooling station where the sheets are chilled rapidly by blasting their opposite surfaces with jets of tempering medium such as blasts of cold air. In order to achieve a desired degree of temper, it is necessary to heat the glass to a temperature sufficiently high (corresponding to a viscosity of $10^{13.3}$ poises for ordinary soda-lime-silica glass) to permit the tempering medium to impart the desired temper. It was difficult in the prior art to raise the temperature of the glass in the furnace to a temperature sufficient for tempering without inducing in the glass a tendency to develop a defect known as roll ripple distortion. Roll misalignment and roll spacing within the furnace were considered to be the major factors causing roll ripple distortion.

In the past, it was proposed to have the tempering apparatus as close to the exit of the furnace as possible, thus reducing the time in which the glass cooled before impinging blasts of tempering medium could be applied thereon. However, this proposed solution was accompanied by cold air entering the exit end of the furnace where the temperature should be highest, thus disrupting the desired temperature gradient of glass sheets along the length of the furnace from a minimum at the entrance end of the furnace to a maximum at the furnace exit, and also disrupting the desired temperature pattern across the width of the furnace, particularly in the vicinity of the furnace exit where the temperature pattern in the glass should be controlled most closely. One of the solutions to this problem is to space the cooling or quenching station from the furnace exit sufficient distance to minimize this problem.

The roller hearth conveyors used in the past have included conveyor rolls having their upper surfaces aligned as precisely as possible throughout the entire length of the furnace to provide spaced, rotating lines of support for moving flat glass sheets in as nearly a perfectly aligned plane as possible. In addition, prior art roller hearth conveyors have included relatively small diameter rolls relatively closely spaced near the exit end of the furnace in order to minimize roll ripple distortion. However, prior to the present invention, the portion of the roller conveyor beyond the furnace exit was either subjected to less severe maintenance than the rolls within the furnace or were ignored altogether.

Since it was considered necessary to apply tempering medium such as air blasts between adjacent conveyor rolls downstream of the furnace exit onto the opposite glass sheet surfaces and to provide paths for the impinging air to escape between the same rolls, the rolls located downstream of the furnace were more widely separated than the rolls within the furnace immediately upstream of the furnace exit. An alternative prior art structure for the roller conveyor portion beyond the furnace exit provided offsetting discs supported on relatively small diameter shafts spaced apart sufficient distances to provide space between adjacent disc axially of each shaft and between discs on adjacent shafts for the application and escape of tempering medium between said discs.

Unfortunately, the prior art resigned itself to the fact that increasing the separation between adjacent rollers or between adjacent discs that supported the hot glass immediately beyond the furnace was a cause of surface irregularity that worked against the beneficial result of surface smoothness that close roll spacing within the hottest portion of the furnace was desired to attain. In addition, the prior art did not appreciate that some latitude of misalignment is permissible in the parallelism of the conveyor rolls located in spaced relation to and upstream of the furnace exit where even though one or more misaligned rolls imparts a pattern of irregularity in the bottom glass surface, it could be removed by rolling the surface over properly aligned rolls at higher temperature.

Furthermore, while the prior art may have ignored altogether the maintenance of near-perfect alignment of all rolls located downstream of the furnace exit, it did not appreciate fully that only those conveyor rolls disposed a sufficient distance downstream of the furnace exit to provide rotating support for glass sheets in downstream locations where the glass was cooled sufficiently to be rigid enough to avoid distortion on engaging said downstream rolls could be ignored from a periodic maintenance program. Hence, considerable time and expense was wasted in servicing all the conveyor rolls when less time and expense was needed to maintain the conveyor in adequate running condition by careful maintenance and repair of the conveyor rolls located in a critical portion only of the conveyor, the location of the critical portion in the prior art erroneously being located entirely within the furnace near the furnace exit.

2. Description of the Prior Art

U.S. Pat. No. 3,806,331 to Bezombes discloses a system for conveying glass sheets through a tunnel and through a quenching station disposed immediately outside the exit of the tunnel. Conveyor rolls having substantially the same diameter are provided throughout the length of the furnace and of the quenching station. The conveyor rolls in the hotter part of the furnace are almost contiguous to reduce the space between the lines of support and prevent sagging between the adjacent rollers. However, the space between the rollers immediately beyond the exit of the furnace was increased to provide space for air blasts to be applied against the opposite surfaces of the flat glass and to escape after impinging on the opposite glass sheet surfaces. The cooling blasts of air applied immediately beyond the furnace exit in Bezombes had to be shielded from the furnace by several furnace shielding means. Furthermore, the need for the provision of relatively wide spacing between rolls immediately outside the furnace exit results in a certain amount of roll ripple distortion in the resulting tempered flat glass sheets.

U.S. Pat. No. 2,144,320 to Bailey, U.S. Pat. No. 3,396,000 to Carson et al. and U.S. Pat. No. 3,454,338 to Ritter disclose conveyor rolls comprising shafts of small diameter that support a series of spaced collars or discs which are offset from roll to roll to provide additional space for the application and escape of air blasts in a cooling station of glass tempering apparatus. Unfortunately, the heat-softened glass sheets tend to sag between these supporting collars not only in the direction of glass movement, but also between spaced collars mounted on the same shafts in the direction transverse to glass movement in the axial direction of the rolls. Hence, roll ripple distortion in glass sheets treated on such apparatus is complicated because two distortion patterns are possible, one parallel to the conveyor rolls or shafts and another transverse to the first distortion pattern.

U.S. Pat. No. 2,140,282 to Drake discloses a roller conveying system for flat glass sheets in which the conveyor rolls are relatively widely spaced in a primary heating zone of a furnace where the glass is initially heated, and relatively closely spaced toward the exit end of the furnace where the glass temperature is much hotter than in the first stage of the furnace. Immediately beyond the furnace exit, the conveyor rolls comprise a series of horizontal shafts of relatively small dimension, each carrying a plurality of spaced short cylindrical discs with the discs on each shaft disposed in overlapping relation and offset from the discs of adjacent shafts. This construction also permits some roll ripple distortion both in the longitudinal direction from shaft to shaft and in a transverse direction from disc to disc mounted on any shaft.

Furthermore, none of the patents enumerated appear to recognize the economic benefit of concentrating primarily on aligning and maintaining in close alignment only those conveyor rolls in a critical portion of the conveyor. Neither does any of the prior art patents recognize the position of the critical portion of the conveyor.

Despite the many patents existing in the glass sheet conveying art, there still remained need for improving the appearance of the surfaces of glass sheets which contain poor optical properties associated with the local deformation caused in the glass by spaced, rotating supports that were misaligned.

SUMMARY OF THE INVENTION

According to the present invention, glass sheets are supported across their entire width in a critical portion of a roller hearth conveyor on closely spaced, small diameter rolls that have their upper surfaces carefully aligned. The conveyor of the present invention extends through the entire length of a tunnel furnace and of a quenching or cooling station and includes a critical conveyor portion whose location differs from that considered critical in the prior art. A range suitable for the diameter of conveyor rolls in said critical portion is 4 to 8 centimeters and a maximum roll-to-roll spacing of 5 millimeters, preferably about 3 millimeters is desirable in said critical conveyor portion. In addition, the present invention provides the teaching that it is not necessary to spend as much attention on aligning or straightening conveyor rolls outside the critical portion of the conveyor as is needed in said critical portion. Furthermore, the present invention teaches the glass sheet tempering art that the critical conveyor portion extends a short portion of the conveyor length from a first location within the furnace a short distance upstream of the furnace exit to a second location outside the furnace a short distance downstream of the furnace exit rather than only upstream of the furnace exit as in the prior art.

The present invention will be understood better in the light of a description of a preferred, illustrative embodiment that follows.

BRIEF DESCRIPTION OF THE DRAWINGS

In the drawings which form part of the description of the illustrative embodiment and wherein like reference numbers refer to like structural elements:

FIG. 1 is a fragmentary, longitudinal, vertical, sectional view of apparatus for heat-treating glass sheets, showing a portion of a roller hearth type of conveyor conforming to an illustrative embodiment of the present invention showing the relation of the critical portion of said conveyor as defined by the present invention to adjacent portions of said conveyor;

FIG. 2 is a fragmentary, horizontal, sectional view of the portion of the apparatus depicted in FIG. 1;

FIG. 3 is a fragmentary, transverse, sectional view of the furnace forming part of the illustrative embodiment of the present invention showing how one of the conveyor rolls in the critical conveyor portion is supported within the furnace; and FIG. 4 is an enlarged view of a portion of the conveyor showing the arrangement of several adjacent conveyor rolls in a portion of the critical portion of the conveyor located beyond the furnace exit.

Referring to the drawings, a furnace 10 of the tunnel type is shown having an exit 12 at its downstream end. The entrance to the furnace near the upstream end of the conveyor C is not shown as is most of the furnace length, because the present invention relates to improvements in a critical portion of the conveyor extending from a short distance upstream of the furnace exit 12 to a short distance downstream of said exit and the manner that glass sheets are treated in the critical portion of the conveyor.

The portion of the conveyor leading to the critical portion of the conveyor within the furnace comprises relatively large conveyor rolls 14, only two of which are shown in the drawings. The rolls 14 are supported on bearing support housings 15 near one of their longitudinal ends and on additional bearing support housings 16 and 17 near their opposite ends. The housings 15 are supported on a longitudinally extending channel member 18, while the housings 16 and 17 are supported, respectively, on inner and outer longitudinally extending channel members 19. Each of the longitudinally extending channel members 18 and 19 is disposed laterally outside one or the other of the respective opposite longitudinal side walls 20 and 21 of ceramic material of the furnace 10.

The large diameter rolls 14 are essentially of asbestos supported on steel shafts 22. The longitudinal extremities of the shaft 22 are reduced in diameter to provide reduced end portion 24 at one of their ends that are received within bearing support housings 15 and reduced end portions 25 at their other ends that are received in additional bearing support housings 16 and 17. The reduced portion 25 of each of the large conveyor rolls 14 is fixed to a sprocket to rotate therewith in response to movement imparted through a first drive chain 26. The shaft 22 for the downstream conveyor roll 14 is provided with a second sprocket for engaging a second drive chain 27.

Downstream of the large conveyor rolls 14 begins the critical portion of the conveyor according to the present invention, where a number of relatively small diameter, relatively closely spaced conveyor rolls 28 of suitable high temperature material, such as steel or suitable ceramic, is provided. The rolls 28 have reduced end portions 29 aligned with the reduced end portions 25 of the steel shafts 22. Each reduced end portion 29 has a sprocket fixed thereto. The second drive chain 27 meshes with these latter sprockets to drive the conveyor rolls 28 in unison.

Each small diameter conveyor roll 28 is supported at the outer end of its reduced end portion 29 in an outer bearing support housing 30, and inwardly of said bearing support housing in any inner bearing support housing 32. The bearing support housings 30 and 32 are supported along the inner and outer longitudinal channel members 19, which are both disposed outside furnace wall 20.

A drive motor 34, supported on the inner channel member 19 is connected, as seen in FIG. 3, to one of the reduced end portions 29 through a chain drive 36 to rotate the rolls 28 and 14 in unison.

Since the small diameter rolls are exposed to the highest temperatures in the furnace, they are liable to warp. To minimize this warp, the following structure is provided within the furnace.

The inner end of each of the small diameter roll 28 is free to expand thermally. In addition, intermediate its ends, each small conveyor roll 28 is rotatably supported on a pair of open type sleeve bearings 37 supported on the upper ends of bearing supports 38 carried by the floor of the furnace 10. The open type sleeve bearings 37 enable the rolls 28 to have their upper extremity portions exposed along their entire length to provide rolling support for conveying flat glass sheets through the exit portion of the furnace.

The conveyor continues beyond the furnace exit 12 with a transfer conveyor section forming another part of the critical conveyor portion and comprising additional conveyor rolls 40 having the same cross-sectional dimensions and spacing as the small diameter rolls 28. Each of these additional conveyor rolls 40 has a sprocket fixed to a reduced end portion 41. The sprockets are entrained by a third conveyor chain drive 42. The most downstream conveyor roll 28 also contains a second sprocket aligned with the aforesaid sprockets on the end portions 41 of reduced diameter of additional conveyor rolls 40 about which is entrained the third conveyor drive chain 42 to enable the rolls 28 and 40 to rotate in unison. The additional conveyor rolls 40 are provided with intermediate portions having the same diameter and spacing as the relatively small, relatively closely spaced conveyor rolls 28 within the furnace 10 and are also covered with very thin fiber glass sleeves 60. If desired, a clutch may be coupled to the most downstream conveyor roll 40 to selectively disengage its said second sprocket, thereby disengaging the third conveyor drive chain 42 when desired.

The additional conveyor rolls 40 form a transition conveyor section between the furnace exit 12 and a first pair of opposing upper and lower slot type nozzles 61 and 62, respectively, of a quenching or cooling station 70. The latter has conveyor rolls 64 arranged in spaced pairs with their glass sheet supporting portions forming a common upper tangent that is a continuation of the common upper tangents of conveyor rolls 14, 28 and 40. The centers of the nozzles are spaced from one another approximately 6 inches (about 15 centimeters) apart and the upper nozzles 61 extend downwardly to terminate in slots, each extending transversely in spaced relation over the conveyor in alignment with a space between adjacent pairs of conveyor rolls 64 with the lower nozzles 62 extending upwardly to terminate in transversely extending slots, each extending transversely in spaced relation below the conveyor so that air blasts under pressure from plenum chambers (not shown) are delivered through the respective nozzles and their slots and between adjacent pairs of conveyor rolls 64 toward the opposite surfaces of glass sheets as the conveyor rolls 64 rotate to convey the glass sheets through the quenching or cooling station 70.

Another feature of the illustrative embodiment of the apparatus is that the pairs of small diameter conveyor rolls 64 replace single conventional large diameter rolls which were disposed between adjacent pairs of opposing slot type nozzles in the quenching or cooling station 70. Each pair of conveyor rolls 64 is separated from the adjacent pair of conveyor rolls 64 sufficiently to provide an area for the application of blasts of tempering medium such as air blasts. The spaces between the conveyor rolls 64 of each pair are smaller than the spaces between adjacent pairs, yet sufficiently farther apart than the rolls 28 in the exit portion of the furnace 10 or the additional conveyor rolls 40 of the transfer conveyor section so as to provide escape paths for the removal of spent air blasts as the latter impinge upon the bottom surface of the moving glass sheets in the quenching or cooling station 70.

The small diameter conveyor rolls 64 in the quenching or cooling station 70 have reduced end portions 65 and 66 received in bearing support housings 67 and 68. Suitable longitudinally extending supports 69 are provided throughout the length of the remainder of the conveyor C for supporting the bearing support housings 67 and 68.

Beyond the quenching and cooling station 70, large diameter conveyor rolls (only one of which is shown in FIGS. 1 and 2) are provided. By the time the glass sheets reach the downstream end of the quenching and cooling station 70, they are sufficiently rigid that they can be supported by more widely spaced conveyor rolls without fear of roll ripple distortion. Larger diameter rolls are used in the non-critical portions of the conveyor because a fewer number of large diameter rolls than the number of smaller diameter rolls is required to cover a given conveyor distance.

The illustrative embodiment of the invention contains 16 small diameter conveyor rolls 28 within the furnace 10, five additional small diameter rolls 40 between the furnace exit 12 and the quenching or cooling station 70, and two conveyor rolls 64 between each adjacent pair of nozzles 61 and 62 in the quenching or cooling station 70. However, the number of rolls in the parts of the critical portion of the conveyor can vary depending on the diameter of the rolls, particularly those in the furnace. A suitable number for furnace rolls 28 of reduced diameter is between 10 and 20, for additional transfer rolls is two to 10 and for the number of rolls 64 that can be interposed between adjacent pairs of slot nozzles 61 and 62 is two or more.

The conveyor rolls 64 in the quenching or cooling station 70 have a diameter of approximately 2 inches (5.08 centimeters), a center-to-center distance of approximately 2½ inches (6.35 centimeters) between the rolls of a pair, and a center-to-center distance of 3½ inches (8.89 centimeters) between rolls of adjacent pairs. The conveyor rolls 28 in the exit portion of the tunnel 10 and the additional conveyor rolls 40 in the transfer portion of the conveyor C have the same diameter as conveyor rolls 64, but have a space therebetween of ⅛ inch (approximately 3 millimeters). The size and spacing of the larger diameter rolls 14 upstream of rolls 28 and the size and spacing of those beyond quenching and cooling station 70 are less critical than the size and spacing of the conveyor rolls in the critical conveyor portion for reasons explained previously.

When glass sheets mass produced on a roller hearth apparatus of the type just described begin to show roll ripple distortion, such distortion can be overcome most readily by correcting any misalignment or departure from desired curvature in the small diameter conveyor rolls 28 and additional conveyor rolls 40 and sometimes those rolls 64 in the upstream positions at the quenching or cooling station 70. In the past, maintenance and repair of all the rolls in the furnace was deemed necessary to overcome the onset of roll ripple distortion.

According to the apparatus aspect of the present invention, the conveyor rolls 28 and 40 in the critical portion of the conveyor should have a diameter of 4 to 6 centimeters, preferably about 4.9 to 5.2 centimeters and a space between adjacent conveyor rolls not exceeding about 5 millimeters, preferably about 3 millimeters. These conveyor rolls and the conveyor rolls 64 in at least the upstream portion of the quenching and cooling station 70 should be maintained in near perfect alignment. Such precise alignment is not as essential in the furnace conveyor rolls 14 in the upstream portion of the furnace 10 and in the quench conveyor rolls 64 downstream of the aforesaid upstream portion.

The glass sheets treated on the apparatus of the present invention are conveyed along a path disposed longitudinally of the conveyor. While the conveyor rolls have reduced end portions received in the bearing support housings, the cylindrically shaped center portions of the conveyor rolls in the critical conveyor portion should have a length at least as long as the dimension of glass sheets transverse to said path so that the conveyor rolls support the entire dimension of said sheets transverse to said path on a plurality of closely spaced, rotating lines of support in the critical portion of the conveyor.

The form of the invention shown and described in this disclosure represents an illustrative embodiment thereof. It is understood that various changes may be made without departing from the gist of the invention as defined in the claimed subject matter that follows.

I claim:

1. A method of heat-treating a flat glass sheet comprising: conveying the sheet in a horizontal disposition on a roller conveyor through a tunnel-type furnace and then through a quenching station, heating the sheet during its passage through the furnace to a temperature suitable for tempering at which the sheet is in a softened condition and is susceptible to roll ripple distortion, cooling the sheet during its passage through the quenching station with blasts of cooling medium applied to opposite surfaces of the sheet, and wherein the sheet during an initial, major portion of its travel through the furnace encounters conditions that induce roll ripple distortion in the sheet, and thereafter supporting the sheet as it passes through a predetermined zone extending from a location within the furnace close to the exit end of the furnace to a location within the quenching station on small diameter, closely spaced conveyor rolls which provide upper lines of contact with the sheet spaced sufficiently close together and aligned with a sufficient degree of accuracy to a common upper tangential plane to significantly reduce the severity of roll ripple distortion caused by said roll ripple inducing conditions.

2. The method of claim 1 further comprising the step of moving the glass sheet on said roller conveyor through an intermediate zone between the furnace exit and the quenching station entrance in which the glass is cooled at a natural rate.

3. The method of claim 1 wherein the glass sheet, as it is passed through said predetermined zone, is supported on rolls having smaller diameters than the rolls outside of said predetermined zone.

4. The method of claim 1 wherein the glass sheet, as it is passed through the portion of said predetermined zone outside the quench station, is supported on rolls more closely spaced than the rolls outside said predetermined zone.

5. The method of claim 1 wherein said encountering of roll ripple inducing conditions includes passing the sheet over conveyor rolls whose upper lines of contact with the sheet diverge from a common upper tangential plane of support.

6. An apparatus for heat treating glass sheets comprising: a tunnel-type furnace having entrance and exit openings in the ends thereof and provided with means for heating glass sheets to a temperature suitable for tempering, at which temperature the glass sheets are in a softened condition which renders them susceptible to roll ripple distortion, a quenching station having means for directing tempering medium against opposite surfaces of glass sheets, and a roller conveyor adapted for transporting glass sheets sequentially through said furnace and then said quenching station along a generally horizontal path, said roller conveyor comprised of a plurality of rolls each having a cylindrical sheet-supporting portion extending transversely to the direction of glass sheet movement and presenting a substantially horizontal line of contact with the glass sheets, said conveyor having a predetermined zone extending from a location within the furnace close to the exit end of the furnace to a location within the quenching station, a portion of the conveyor upstream from said predetermined zone presenting roll ripple inducing conditions to glass sheets passing thereover, the rolls in said predetermined zone having small diameters and being sufficiently closely spaced and being aligned with one another to a sufficient degree of accuracy such that the lines of glass contact lie essentially within a common horizontal plane to significantly reduce the severity of roll ripple distortion caused by said roll ripple inducing conditions upstream from said predetermined zone.

7. The apparatus of claim 6 wherein the cylindrical sheet-supporting portions of the rolls in said predetermined zone of the conveyor are smaller in diameter than those outside said zone.

8. The apparatus of claim 7 wherein the rolls in said predetermined zone of the conveyor outside the quenching station are more closely spaced than the rolls outside the predetermined zone.

9. The apparatus of claim 8 wherein said predetermined zone additionally includes an intermediate conveyor section between the exit of said furnace and the entrance of said quenching station.

10. The apparatus of claim 9 wherein said predetermined zone includes about 10 to 20 rolls within the furnace and about two to 10 rolls in said intermediate conveyor section.

11. The apparatus of claim 10 wherein the rolls of said predetermined zone within the furnace and within said intermediate section have a diameter between 4 and 6 centimeters and have spaced between adjacent sheet-supporting cylinders of not more than 5 millimeters.

12. The apparatus of claim 11 wherein said quenching station includes transversely extending nozzles between the conveyor rolls for directing quenching medium toward the glass sheets, with at least two conveyor rolls between adjacent nozzles.

* * * * *